United States Patent [19]

Hutchings

[11] 3,870,731

[45] Mar. 11, 1975

[54] OXIDATION OF PHENOLS AND ALKYL SUBSTITUTED PHENOLS TO THEIR CORRESPONDING PARA-BENZOQUINONE

[75] Inventor: David A. Hutchings, Stow, Ohio

[73] Assignee: The Goodyear Tire & Rubber Company, Akron, Ohio

[22] Filed: Sept. 28, 1973

[21] Appl. No.: 401,724

[52] U.S. Cl............................................. 260/396 R
[51] Int. Cl............................................. C07c 49/64
[58] Field of Search ................................. 260/396 R

[56] References Cited
UNITED STATES PATENTS

| 3,213,114 | 10/1965 | Braxton, Jr. | 260/396 R |
| 3,219,625 | 11/1965 | Blanchard et al. | 260/396 R |
| 3,219,626 | 11/1965 | Blanchard et al. | 260/396 R |

Primary Examiner—Vivian Garner
Attorney, Agent, or Firm—F. W. Brunner; C. R. Schupbach

[57] ABSTRACT

This invention concerns a process for oxidizing phenol and substituted phenols to their corresponding p-benzoquinones with oxygen in the presence of catalysts selected from metallic copper and copper salts promoted by thiocyanate, cyanate, or cyanide ions.

11 Claims, 5 Drawing Figures

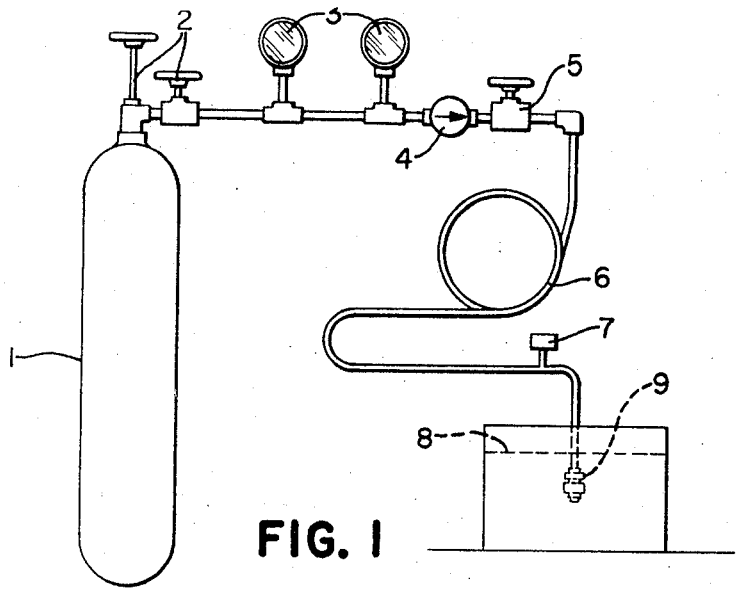
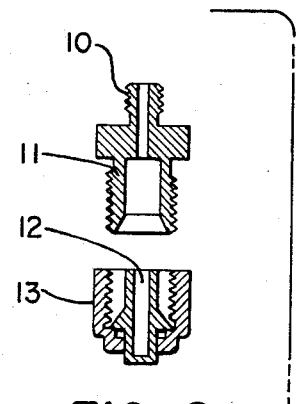
FIG. 1
FIG. 2
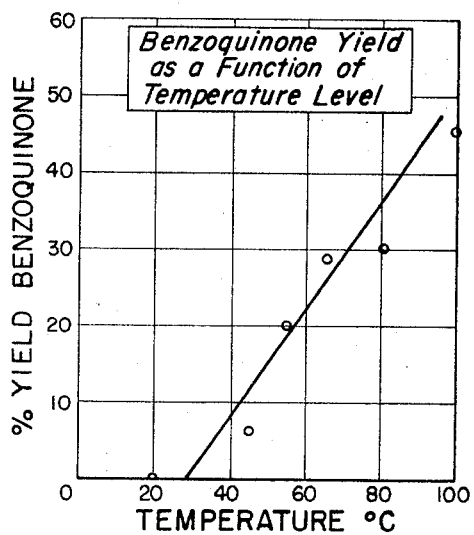
FIG. 3
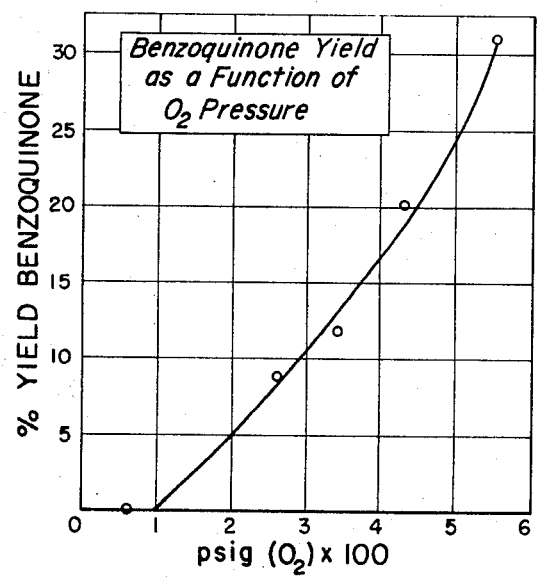
FIG. 4
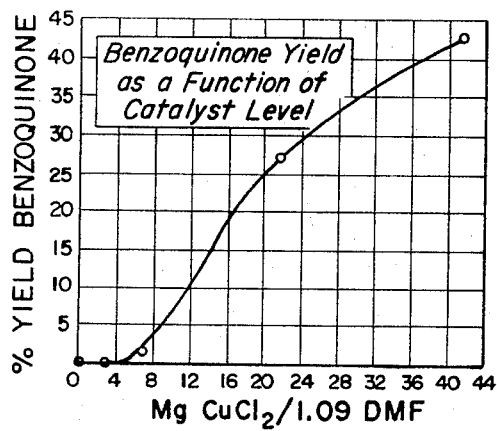
FIG. 5

OXIDATION OF PHENOLS AND ALKYL SUBSTITUTED PHENOLS TO THEIR CORRESPONDING PARA-BENZOQUINONE

The present invention relates to the oxidation of phenol and ortho, meta, and ortho-meta substituted phenols with oxygen in the presence of particular catalysts and solvents to form benzoquinones.

Benzoquinones have heretofore been manufactured from the corresponding phenols by treating the phenols with oxidizing agents. For example, it is known that phenol may be oxidized using sodium dichromate in an aqueous sulfuric acid medium. These prior art oxidation methods, however, have the disadvantage that they produce solid metal oxides as by-products and require stoichiometric amounts of the oxidant. An additional disadvantage is that the benzoquinone products formed are mixed with other compounds and must be isolated in pure form.

It is desirable to have a commercial process which yields these benzoquinone materials in significant yield and having a high degree of purity by a direct catalytic oxidation of the corresponding phenols.

In accordance with the present invention phenol or substituted phenols can be oxidized directly to the corresponding benzoquinone in the presence of copper containing catalysts and a solvent such as methanol with oxygen as an oxidant.

Throughout this specification and claims the terms "benzoquinone" and "corresponding benzoquinone" refer only to the para-benzoquinone (1,4 benzoquinone).

Phenols useful in the present invention are phenols which have the general formula

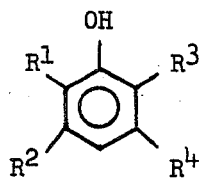

wherein $R^1$, $R^2$, $R^3$ and $R^4$ are the same or different radicals selected from the group consisting of hydrogen, halo, alkyl radicals having from 1 to 15 carbon atoms, aryl radicals having from 5 to 20 carbon atoms, alkoxy radicals having 2 to 20 carbon atoms, aralkyl radicals having from 6 to 12 carbon atoms and alkylaryl radicals having from 7 to 16 carbon atoms.

Phenols representative of those useful in the practice of this invention include phenol, 2,6-di-t-butyl phenol, 2-t-butyl phenol, α-naphthol, m-cresol, o-cresol, o-phenylphenol, o-chlorophenol, o-benzylphenol, 2,6di-chlorophenol and o-vinylphenol.

Examples representative of halo radicals are chloro, iodo, and bromo; of alkyl radicals are ethyl, butyl, and decyl; of aryl radicals are phenyl and naphthyl; of alkoxy radicals are o-hydroxy phenitol, and o-hydroxy anisol; of aralkyl are benzyl and phenylhexyl; and of alkylaryl are methylphenyl and decylphenyl.

The reacrion can be carried out at a temperature of from about 30° to about 150° C. Usually a temperature in the range of from about 50° to about 100° C. will be used. The reactor pressure used can range up to about 1,500 pounds per square inch gauge pressure (psig) of oxygen containing gases, and preferably in the range of from 0 to 750 psig of oxygen containing gases.

The amount of catalyst used can vary widely. Thus in a batch-type process the amount of catalyst can be in the range of from about 0.001 mole of catalyst per mole of phenol to about 5 moles of catalyst per mole of phenol depending on the phenol being oxidized. Preferably the range will be from about 0.001 mole of catalyst per mole of phenol to about one mole of catalyst per mole of phenol, and most preferably from about 0.1 mole of catalyst per mole of phenol to about one mole of catalyst per mole of phenol. In a continuous process the amount of catalyst used can vary up to several hundred moles of catalyst per mole of phenol. Such catalyst levels greatly increase the conversion rate of phenol to benzoquinone and are used in processes such as fixed-bed catalyzed reactions where only a small amount of phenol is present in the catalyst bed at any given time. The benzoquinone is separated from the catalyst bed effluent and the solvent is recycled.

The element copper is essential to the phenol oxidation of this invention. The process can be carried out in the presence of at least one copper containing material as catalyst. The copper may be present in cupric or cuprous ionic form or as metallic copper. Thiocyanate, cyanate, cyanide ions and halogen ions are useful as catalyst promoters and in combination with the copper have catalytic activity. Ligands such as those illustrated above are present in a preferred concentration of from about 5 mole percent to about 200 mole percent with respect to the copper concentration.

Table I

| Conditions: Temperature 65° C; Pressure 500 psig O₂ | | | | | |
|---|---|---|---|---|---|
| Salt | Reaction Time | Wt Salt mg | Wt Phenol mg | Wt DMF gms | Yield Benzo-quinone % |
| Cu(OAc)₂* | 60 min | 19.3 | 107.2 | 1.00 | 0 |
| CuCl | 90 min | 24.2 | 98.4 | 1.00 | 78.2 |
| CuBr | 60 min | 20.0 | 100.0 | 1.00 | 42.0 |
| Cu° | 120 min | 20.0 | 100.0 | 1.00 | 0 |
| CuCl₂ | 135 min | 9.6 | 111.5 | 1.00 | 22.2 |
| CuCl₂+Cu° | 135 min | 9.6 | 111.5 | 1.00 | 49.2 |

*Cupric acetate

The terms "mole % of catalyst" and "mole of catalyst per mole of phenol" are calculated based on the amount of copper (as metal) in the catalyst. Copper is an essential element.

The ratio of copper to ligands present in the catalyst affects the rate of oxidation of phenols. Table II below gives comparative results of varying the cyanide ligand to copper ratio in the oxidation of o-cresol in dimethylformamide (DMF) using copper acetate as the source of copper ions and postassium cyanide as the source of cyanide ligand.

All experimental data disclosed herein was generated by reactions carried out in a micro-oxidation reactor as illustrated in FIG. 1. The apparatus comprises a high pressure oxygen bearing gas supply 1 connected to valves 2 for releasing the oxygen-bearing gas which leads to the high pressure gas regulators 3 set in the line carrying the gas through a check valve 4 and on to a high pressure on/off valve 5. The gas then passes through a 10-foot looped surge barrier 6 and on into the micro-oxidation reactor 9. A safety rupture disc 7 rated at 750 pounds per square inch gauge pressure (psig) is connected to the line to avert dangerous pressures in the reactor. A constant temperature bath 8 maintains the desired reactor temperature.

FIG. 2 describes the reactor itself in actual size. The illustration begins with the connection to the tubing carrying the oxygen bearing gas 10. The two halves of the reactor 11 and 13 can be separated and joined by means of a thread assembly. The reaction chamber 12 itself has a capacity of 100 microliters ($\mu$l). Other types of apparatus well known to those skilled in this art may easily be used to carry out the processes described herein. The description of the apparatus is illustrative only and not intended to limit the scope of this invention.

The data of Table II were obtained from Examples 1–4 run in the following manner. Cupric acetate, potassium cyanide and o-cresol were weighed into a one ounce glass bottle. One gram of DMF was weighed into the same vessel, and the system was heated to effect solution of the reactants. A 30 microliter aliquot of the DMF·phenol·catalyst solution was charged into a micro oxidation reactor, pressurized to 500 psig $O_2$ pressure and heated to 60° C. Samples were collected at 15 and 30 minutes.

Table II

| Example | Ratio Cu(OAc)$_2$/KCN (mg) | Percent Conversion | |
|---|---|---|---|
| | | 15 mins. | 30 mins. |
| Control | 19.3/0.0 | no conversion after one hour | |
| 1 | 28.7/8.6 | 24.2 | 32.7 |
| 2 | 28.6/11.8 | 29.4 | 36.5 |
| 3 | 28.6/16.5 | 22.0 | 27.6 |
| 4 | 27.8/27.2 | 8.35 | 14.1 |

Solvents useful in the present invention are preferably water and polar solvents soluble in water or miscible with water. The solvents can be selected from the group consisting of (A) water, (B) n-alkyl substituted amides selected from the group consisting of dimethylformamide (DMF), diphenylformamide, N-methyl-2-pyrrolidone, cyclohexylmethylformamide and phenylmethylformamide, (C) alcohols selected from the group consisting of methanol, ethanol and isopropanol, and (D) sulfoxides selected from the group consisting of dimethylsulfoxide (DMSO), cyclohexylmethylsulfoxide and phenylmethylsulfoxide. Any of these solvents may be used along or in combination with water in any desired ratio.

The pH of the reaction media directly affects the selectively of the phenol oxidation to the benzoquinone form. Generally the addition of acid to yield a pH of from 4.0 to 7.5 leads to improved reaction efficiency. Examples 5 through 8 below show a direct comparison between an acidified and a nonacidified reaction.

EXAMPLE 5

The following reaction mixture was prepared.

| 2,6-di-t-butyl phenol | 103.0 milligrams |
|---|---|
| T-butyl benzene | 37.5 milligrams |
| CuCl$_2$ | 22.6 milligrams |
| DMF | 1.0 gram |

An aliquot of the above mixture was charged into the microoxidation reactor. After 10 minutes reaction time at 65° C. and 500 pounds per square inch gauge pressure (psig) $O_2$, a sample was taken and the reaction efficiency was found to be 87.5 percent to the 2,6-di-t-butyl benzoquinone. The same procedure was repeated except that 6 milligrams of trifluoroacetic acid were added to the reaction mixture. A 30 microliter aliquot of the mixture was charged into the microoxidation reactor. After 10 minutes reaction time at 65° C. and 500 psig $O_2$, a sample was taken. The efficiency for this reaction to 2,6-di-t-butyl benzoquinones was 100 percent.

EXAMPLE 6

A one-half ounce bottle was charged with 30.3 milligrams of potassium thiocyanate, 108.1 milligrams of o-cresol and one gram of dimethylformamide. Thirty microliters of the solution thus formed was charged into a microreactor containing 16.4 milligrams of metallic copper. After 30 minutes reaction time at 65° C. and 500 psig, the phenol, oxidation was 72.5 percent. The p-benzoquinone was present at 46 percent with respect to the starting solution.

EXAMPLE 7

27.6 Milligrams of potassium thiocyanate and 98.6 milligrams of o-cresol were dissolved in 1.0 gram of dimethylformamide. Two microliters of 98 percent sulfuric acid were added. Thirty microliters of the solution were charged into a microreactor containing 10.7 milligrams of metallic copper. After 30 minutes reaction time under the same conditions as in Example 2, 46 percent of the o-cresol had been oxidized with 100 percent efficiency to the p-benzoquinone.

EXAMPLE 8

A solution of 27.5 milligrams of potassium thiocyanate and 111.0 milligrams of o-cresol in 1.0 grams of dimethylformamide was prepared. Five microliters of 98 percent sulfuric acid was added. Thirty microliters of the solution was charged into a microreactor containing 9.4 milligrams of metallic copper. After reacting the solution for 30 minutes under the same conditions as in Example 2, only 8.30 percent phenol oxidation had occured, with 100 percent efficiency to the p-benzoquinone.

The data from Examples 5 through 8 show by comparison that as acidification of the reaction mixture increases, the amount of phenol conversion decreases. The efficiency of the reaction to p-benzoquinones goes up to 100 percent as the acidification of the reaction mixture increases to a pH of 4.0. Throughout this specification and claims efficiency was calculated very simply by the formula:

(weight of phenol converted to benzoquinone)/(total weight of phenol oxidized) $\times$ 100

The effect of various levels of catalyst, temperature and pressure are illustrated in FIGS. 3, 4 and 5. Agitation of the reaction mixture while the reaction was taking place was also of some help in decreasing reaction time.

FIGS. 3, 4 and 5 show the respective effects of temperature, oxygen pressure and catlyst level on the yield of benzoquinone.

The following examples illustrate this invention. All parts and percentages are by weight unless otherwise indicated.

EXAMPLE 9

A typical run was made in the following manner. Cupric acetate 21.2 milligrams, potassium thiocyanate 57.1 millagrams, and 2,6-di-t-butylphenol 125.8 milligrams were weighed into a reaction vessel. One gram of dimethylformamide was weighed into the same vessel whereupon the system was heated for a short time to effect complete solution of the reactants. A 30 microliter aliquot of the DMF solution was charged into a micro-oxidation reactor. The reactor was pressurized to 500 psig $O_2$ and heated to 60° C. After a suitable reaction time the reaction system was cooled, depressurized and sampled. Analysis of the results showed that after a reaction time of seven minutes the observed yield of 2,6-di-t-butyl benzoquinone was 100 percent.

EXAMPLE 10

A second reaction was made using cupric acetate 22.7 milligrams, potassium cyanate 42.1 milligrams and 2,6-di-t-butylphenol 118.2 milligrams. The same typical run was followed as in Example 1. At a reaction time of seven minutes the analysis showed a 100 percent yield of 2,6-di-t-butyl benzoquinone.

EXAMPLE 11

Cupric chloride 26.6 milligrams, phenol 524.2 milligrams and dimethylformamide 1.0 gram were weighed into a 2-ounce bottle and dissolved completely. Thirty microliters were introduced into a microreactor and placed under 500 psig $O_2$ pressure, and heated to a constant temperature between 65° and 70° C. After reacting with agitation for 16 hours, the benzoquinone yield was 40.3 percent.

EXAMPLE 12

Cupric acetate 60.0 milligrams, phenol 100 milligrams and potassium thiocyanate 20 milligrams were completely dissolved in one cubic centimeter of DMF. Thirty microliters were charged into a microreactor and reacted for 30 minutes at 500 psig $O_2$ at 65° C. The phenol oxidation was 33 percent with 100 percent selectively to benzoquinone. After 60 minutes the phenol was 50 percent oxidized with 98 percent selectivity to the benzoquinone.

EXAMPLE 13

Thirty-five milligrams of potassium thiocyanate and 100 milligrams of phenol were dissolvedd in 1.0 cubic centimeter of DMF and 30 microliters were charged into a microreactor along with 10 milligrams of powdered metallic copper. The phenol was oxidized at 500 psig $O_2$ at 65° C. for 30 minutes. No appreciable conversion was noted. The reaction was repeated for 60 minutes, at which time the phenol was 13.5 percent oxidized with 100 percent selectivity to benzoquinone. A 120 minute reaction yielded 42.2 percent conversion with 100 percent selectivity to benzoquinone showing an initiation period occurs before the reaction rate becomes appreciable.

EXAMPLE 14

Ninety-seven milligrams of o-cresol and 27.5 milligrams of potassium thiocyanate were dissolved in 1 cubic centimeter of DMF and 26.0 milligrams of trifluoroacetic acid. Thirty microliters were charged into a microreactor containing 2.1 milligrams of metallic copper. The system was pressurized to 500 psig and 65° C. for 30 minutes. 11.2 Percent of the phenol was oxidized with 90 percent selectively to the benzoquinone. After 60 minutes, 47.5 percent of the phenol was oxidized with 90 percent selectivity to the benzoquinone.

EXAMPLE 15

One hundred milligrams of phenol, 40 milligrams of $CuCl_2$ and 1 gram of methanol were weighed into a one-half ounce bottle and agitated until the solution was complete. Two hundred microliters of the mixture were charged into the micro-oxidation reactor and reacted at 65° C. under 500 psig $O_2$ for times of 60 and 120 minutes.

| Time in minutes | Benzoquinone Yield |
|---|---|
| 60 | 47 percent |
| 120 | 68.2 percent |

Both runs had benzoquinone yield efficiencies of nearly 100 percent.

Phenol and alkyl substituted phenols can be converted according to this invention to their corresponding benzoquinones by using copper catalysts together with an ionic ligand, and a solvent using oxygen as an oxidant. Phenols and alkyl substituted phenols can be converted under the same reaction conditions, but for phenol relatively high oxygen pressures and catalysts levels are required, especially in unagitated systems, in order to give equivalent benzoquinone yields in short reaction times. In contrast to the oxidation of phenol, when alkyl substitution is introduced into either the ortho or meta positions, lower catalyst concentration and lower oxygen pressures are necessary to an equivalent benzoquinone yield even when the reaction solution is unagitated. Alkyl substitution thus increases the ease of oxidation of phenols to the p-benzoquinone form.

While the examples given show levels of phenol oxidation around 50 percent, longer reaction times would of course increase the amount of oxidation. Practical reaction times will be dictated by the selection of phenol, catalyst, temperature and pressure of oxygen bearing gas. In a continuous reaction process catalyst levels can be very high, on the order of several hundred moles of catalyst to 1 mole of phenol, for example, which allows an extremely fast reaction rate.

Representative examples of phenols and substituted phenols that can be oxidized by the process of this invention are phenol, o-cresol, 2,6-di-t-butylphenol, 2-methyl-6-t-butylphenol, 2,6-dimethylphenol, 2-t-butylphenol and 2-ethylphenol.

Representative examples of benzoquinones that can be prepared by the process disclosed in this invention are p-benzoquinone, 2,6-di-t-p-benzoquinone, 2-methyl-6-t-butyl-p-benzoquinone, methyl-p-benzoquinone, t-butyl-p-benzoquinone, ethyl-p-benzoquinone, and 2,6-dimethyl-p-benzoquinone.

While certain embodiments and details have been shown for the purpose of illustrating the invention, it will be apparent to those skilled in this art that various changes and modifications may be made herein without departing from the spirit or the scope of the invention.

I claim:
1. A process comprising reacting a solution of phenol in a solvent with oxygen in the presence of at least one copper containing material, as catalyst, said catalyst being selected from the group consisting of copper (I) ions, copper (II) ions and metallic copper and a promoter selected from the group consisting of chloro, bromo, iodo, thiocyanate, cyanate and cyanide ions and wherein the reaction is carried out at an oxygen partial pressure up to 750 psig and at a temperature of 30° to 150°C. in the presence of from 0.01 mole of catalyst per mole of phenol to 5.0 moles of catalyst per mole of phenol said solvent being selected from the group consisting of:
  A. water,
  B. N-alkyl substituted amides selected from the group consisting of dimethylformamide, diphenylformamide, N-methyl-2-pyrrolidone, cyclohexylmethylformamide, and phenylmethylformamide,
  C. alcohols selected from the group consisting of methanol, ethanol and isopropanol and
  D. sulfoxides selected from the group consisting of dimethylsulfoxide, cyclohexylmethylsulfoxide and phenylmethylsulfoxide.

2. A process as described in claim 1 wherein the reaction is carried out at a temperature of from 50° to 100° C.

3. A process as described in claim 2 above wherein phenol and the catalyst are dissolved in at least one solvent selected from the group consisting of water, dimethylformamide, dimethylsulfoxide, methanol, ethanol and isopropanol.

4. A process as described in claim 3 above wherein the solvent is methanol.

5. A process comprising reacting a solution of phenol or alkyl substituted phenol of the general formula

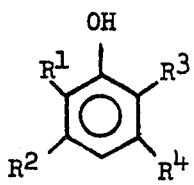

wherein $R^1$, $R^2$, $R^3$ and $R^4$ are the same or different radicals selected from the group consisting of hydrogen, halo, alkyl radicals having from 1 to 15 carbon atoms, phenyl and naphthyl alkoxy radicals having from 2 to 20 carbon atoms, phenylalkyl radicals having from 6 to 12 carbon atoms, and alkylphenyl radicals having from 7 to 16 carbon atoms with oxygen in the presence of at least one copper containing material as catalyst, said catalyst being selected from the group consisting of copper (I) ions, copper (II) ions, and metallic copper and a promoter selected from the group consisting of thiocyanate, cyanate and cyanide ions, and wherein the reaction is carried out in the presence of gas containing oxygen at a pressure of up to 750 psig and at a temperature of 30° to 150°C. with a catalyst level of 0.01 mole of catalyst per mole of phenol to 5.0 moles of catalyst er mole of phenol said solvent being selected from the group consisting of:
  A. water,
  B. N-alkyl substituted amides selected from the group consisting of dimethylformamide, diphenylformamide, N-methyl-2-pyrrolidone, cyclohexylmethylformamide, and phenylmethylformamide,
  C. alcohols selected from the group consisting of methanol, ethanol and isopropanol and
  D. sulfoxides selected from the group consisting of dimethylsulfoxide, cyclohexylmethylsulfoxide and phenylmethylsulfoxide.

6. A process as described in claim 5 wherein the reaction is carried out a temperature of from 50° to 100° C.

7. A process as described in claim 6 above wherein the phenol and the catalyst are dissolved in a solvent or combination of solvents selected from the group consisting of water, dimethylformamide, dimethylsulfoxide, metehanol and ethanol.

8. A process as described in claim 7 wherein the reaction mixture is acidified to a pH of from about 4.0 to 7.5.

9. A process as described in claim 7 wherein the ions selected from the group consisting of cyanide, thiocyanate and cyanate are in a concentration of from 5 mole percent to 200 mole percent with respect to the copper concentration.

10. A process as described in claim 7 wherein the phenol is selected from the group consisting of 2,6-di-t-butyl phenol and butyl phenol.

11. A process as described in claim 1 wherein the solution of phenol and oxygen is passed through a catalyst bed containing at least a catalytic amount of catalyst.

* * * * *

UNITED STATES PATENT OFFICE
CERTIFICATE OF CORRECTION

PATENT NO. : 3,870,731
DATED : March 11, 1975
INVENTOR(S) : David A. Hutchings

It is certified that error appears in the above-identified patent and that said Letters Patent are hereby corrected as shown below:

Column 1, line 55, "2,6di" should read -- 2,6-di- --;
line 64, "reacrion" should read -- reaction --.

Column 2, line 11, "0.1" should read -- 0.01 --.

Column 3, line 51, "selectively" should read -- selectivity --.

Column 4, line 9, "benzoquinones" should read -- benzoquinone --.

Column 5, line 43, "selectively" should read -- selectivity --.

Column 6, line 3, "selectively" should read -- selectivity --;
line 38, "to" should read -- for --;
line 60, "2,6-di-t-p-benzoquinone" should read
-- 2,6-di-t-butyl-p-benzoquinone --.

Signed and Sealed this twenty-third Day of September 1975

[SEAL]

Attest:

RUTH C. MASON
Attesting Officer

C. MARSHALL DANN
Commissioner of Patents and Trademarks